United States Patent Office 3,208,986
Patented Sept. 28, 1965

3,208,986
POLYMERIZATION CATALYSTS AND THEIR USE IN THE POLYMERIZATION OF UNSATURATED HYDROCARBONS
Giorgio Mazzanti, Paolo Longi, Francesco Bernardini, and Giulio Natta, Milan, Italy, assignors to Montecatini Società Generale per l'Industria Mineraria e Chimica, a corporation of Italy
No Drawing. Filed Nov. 20, 1959, Ser. No. 854,230
Claims priority, application Italy, Nov. 28, 1958, 17,690/58
19 Claims. (Cl. 260—93.7)

This invention relates to new polymerization catalysts, methods for producing them, and use thereof for the polymerization of ethylene and other hydrocarbon monomers containing at least one unsaturated vinyl bond.

It is known to polymerize hydrocarbon monomers containing at least one unsaturated bond of the vinyl type with catalysts prepared from transition metal compounds and organometallic compounds, i.e., compounds containing a direct metal-to-carbon bond, and which catalysts contain highly reactive organometallic bonds. A typical catalyst of this type is prepared by mixing $TiCl_4$ with an alkyl Al compound.

It is one object of this invention to provide new catalysts for the polymerization of ethylene and other hydrocarbon monomers containing a vinyl double bond.

This and other objects are accomplished by the present invention which provides new polymerization catalysts prepared from (1) transition metal compounds, more particularly halides, and (2) compounds of metals belonging to the 1st to 3rd groups inclusive of the Mendeléeff Periodic Table, more particularly lithium, beryllium, magnesium and aluminum, in which the metal is bound directly to nitrogen atoms and which do not contain organometallic (metal-to-carbon) bonds.

Particularly useful compounds for use as the second component of the catalyst are those having the general formula (I)  $X_nMe[N(R_1R_2)]_m$ where Me is a metal belonging to the 1st, 2nd or 3rd group of the Periodic Table, and more particularly lithium, beryllium, magnesium or aluminum, X is chlorine, bromine or iodine, $R_1$ and $R_2$ can be the same or different alkyl, cycloalkyl, aryl, or alkylaryl groups having up to 8 carbon atoms or, together with the nitrogen atom, can form a heterocyclic ring such as pyrrole, carbazole, etc. $n$ is zero or an integer, $m$ is an integer; and the sum of $n$ plus $m$ equals the valence of the metal.

Compounds having the general formula (II) 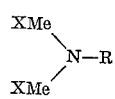

where X is chlorine, bromine or iodine, Me is beryllium or magnesium, and R is an alkyl, cycloalkyl, aryl or alkylaryl group having up to 8 carbon atoms can also be used as the second catalyst component.

Compounds embraced in formula I include the alkyl, cycloalkyl, and aryl-substituted amides of the metals, the corresponding derivatives of heterocyclic compounds containing nitrogen in the ring, and the corresponding halides. Specifically, such compounds include aluminum tris(dialkylamides) and tris(diarylamides), the corresponding pyrrole and carbozole derivatives of aluminum, the chlorides and bromides of beryllium and magnesium dialkylamides and of aluminum bis-dialkylamides, etc.

Compounds of the metals embraced in Formula II include the bis(magnesium halide) and bis(beryllium halide)-alkyl amides and arylamides, such as, e.g., $C_6H_5N(MgI)_2$, $C_2H_5N(BeBr)_2$ and the like.

The compounds used as the second component in preparing our new polymerization catalysts are not only novel as components of the catalysts but certain of those compounds are new, per se. Thus, aluminum compounds containing aluminum-to-nitrogen bonds have not been known prior to this invention. We prepared the new aluminum compounds containing aluminum-to-nitrogen bonds and no aluminum-to-carbon bonds by reacting aluminum chloride with the corresponding Grignard's reagent, or by reacting aluminum chloride with the corresponding potassium amide.

Illustratively, we prepared magnesium diphenylamide bromide (e.g., as described by B. Oddo, Gazzetta Chemica Italiana, 41, I, 255, 1911,) by reacting diphenylamine with ethyl magnesium bromide and then obtained aluminum tris(diphenylamide), $Al[(C_6H_5)_2N]_3$, therefrom, usually by exchange reaction with anhydrous aluminum chloride, as shown below:

A solution of 12 g. aluminum chloride in 100 cc. ether is added slowly, while stirring under nitrogen, to a magnesium diphenylamide solution (obtained from a solution of 0.3 mol ethylmagnesium bromide in 200 cc. anhydrous ether and 50 g. diphenylamine in 150 cc. anhydrous benzene).

Toward the end of the addition the separation of a white precipitate consisting of the magnesium halide, takes place. The mixture is boiled for a further two hours while stirring and all the liquid present (ether and benzene) is then removed by distillation, first under atmospheric pressure and then under decreasing pressures down to 1.0 mm. Hg, while heating the flask on an oil bath to 150° C.

The solid residue is extracted repeatedly with anhydrous benzene, the clear dark brown liquid resulting from each extraction being poured by decantation under nitrogen in a 500 cc. flask.

A solution containing about 25 g. aluminum-tris-(diphenylamide) in 300 cc. benzene is thus obtained.

The presence of the aluminum-to-nitrogen bond in the compounds we obtain by reacting aluminum chloride with potassium diphenyl amide, or with Grignard's compounds of diphenylamide, is demonstrated either by hydrolysis of the product obtained or by attack with ethyl chloroformate.

In the first case, diphenylamine is obtained with good yields. In the second case, the urethane corresponding to the formula $(C_6H_5)_2N$—$CO$—$OC_2H_5$ is obtained.

Alternatively the new aluminum compounds, and similar compounds of the other listed metals, can be prepared starting from alkyls of the metals and making them react with dialkyl- or diaryl-amines.

Thus, tri-isopropyl aluminum of 95% purity, 44.7 g., disolved in 70 cc. n-heptane, is contacted in an atmosphere of nitrogen with a solution of 60 g. dimethylamine in 100 cc. n-heptane, in a 1 l. autoclave. The autoclave is heated for 15 hours at 190°–200° C.; after cooling, the product is discharged and the excess of amine and part of the heptane are distilled off under reduced pressure. By cooling to 0° C. large, colorless crystals separate, which upon analysis are found to consist of aluminum tris-dimethylamide, $Al[N(CH_3)_2]_3$, containing 16.6% aluminum and 26.2% nitrogen. The yield on the employed tri-isobutyl-aluminum is approximately 80%.

Similarly, one can prepare beryllium-bis(diphenylamide), $Be[N(C_6H_5)_2]_2$, starting from diethyl beryllium and diphenylamine in anhydrous benzene, according to the reaction $$Be(C_2H_5)_2 + 2NH(C_6H_5)_2 \rightarrow Be[N(C_6H_5)_2] + 2C_2H_6$$

Starting from 5.15 g. diethyl beryllium and 32 g. diphenylamine, in two hours at the boiling temperature, 3 liters of a gas containing 98% ethane are collected and a white powder is obtained, which contains 2.5% beryllium and 8.2% nitrogen, and corresponds to the above formula.

Other compounds of the 1st to 3rd groups of the Periodic Table of the aforementioned class and containing metal-to-nitrogen bonds can be prepared by similar methods.

In addition to the compounds of the classes already mentioned, other compounds in which an atom of a metal of the 1st, 2nd and 3rd groups of the Periodic Table is bound to nitrogen and which do not contain organic groups in the molecule are suitable as components of the polymerization catalysts. Compounds of this type are the nitrides of the aforementioned metals, and in particular aluminum nitride.

All of the compounds mentioned can be mixed with transition metal compounds to yield new catalysts which do not contain direct metal-to-carbon bonds, and which are useful catalysts for the polymerization of ethylene, higher alpha-olefins, and diolefins containing at least one vinyl double bond. The transition metal compounds are preferably halides of metals belonging to the 4th to 8th groups inclusive of the Mendeléeff Periodic Table, such as Ti, Zr, V, Cr, Mo, Mn, Fe, Co, and Ni.

Halides of the transition metals in which the metal has a valency lower than the maximum valency corresponding to its position in the Periodic Table, e.g., titanium di- and trichloride, vanadium di- and trichloride, molybdenum tri- and pentachloride, cobalt dichloride, etc., are preferred components for preparing our new catalysts.

The molar ratio of nitrogen compound to transistion metal compound in the cataylst can vary between wide limits, and usually is of between 0.5:1 and 5:1.

The polymerization of the olefin in contact with these catalysts is preferably carried out in aromatic solvents, such as benzene, toluene, xylenes, which are at least partial solvents for the metallic compound containing the metal-to-nitrogen bonds, and at temperatures comprised between room temperature and 200° C., preferably between 50° C. and 150° C.

Aliphatic hydrocarbon solvents, such as hexane, heptane etc., can also be used, or mixtures thereof with aromatic hydrocarbons.

The polymers obtained using the new catalysts of this invention are characterized by a highly regular structure which heretofore has only been characteristic of polymers resulting from the use of the catalysts prepared using organometallic compounds.

For example, these catalysts polymerize ethylene to perfectly linear polymers in which no branchings can be observed by infra-red analysis. The polymer obtained is more linear and has a higher crystallinity than polyethylene produced with the most typical so-called "Ziegler catalysts" prepared from $TiCl_4$ and alkyl aluminum compounds.

Polymers of the higher alpha-olefins, $CH_2=CHR$, where R is hydrocarbon such as propylene, butene-1, etc., having a high content of isotactic macromolecules (according to Natta et al.) can be obtained with these catalysts.

In the case of the diolefins, more particularly butadiene and isoprene, the polymerization can be oriented to the formation of polymers having various of the possible structures, by suitable selection of the polymerization conditions and of the transition metal compound used as one component of the catalyst.

The following examples are given to illustrate the invention, it being understood that these examples are not intended to be limiting.

*Example 1*

5 g. aluminum-tris(diphenylamide) and 2 g. $TiCl_3$ in 250 cc. anhydrous benzene are introduced into a 1100 cc. oscillating autoclave under nitrogen. Agitation is started and ethylene is added up to a pressure of 45 atm. at room temperature; the temperature of the autocalve is then quickly raised up to 100° C.

The autoclave is agitated at this temperature for about 8 hours, heating is stopped and, when the inner temperature has reached 40° C., the gaseous phase, consisting of residual ethylene which, by analysis, is found to be free of other hydrocarbons (except for benzene vapors), is discharged.

A highly compact polyethylene mass, amounting to 130 g. after drying, is withdrawn from the autoclave.

The purification of the crude product is carried out by breaking the compact mass, treating repeatedly the broken mass with methanol acidified with concentrated hydrochloric acid, washing it again with methanol and finally drying the polymer at 80° C. under reduced pressure.

The polymer, consisting of polyethylene having an average molecular weight of 780,000 (determined by viscosimetry) exhibits a crystallinity of 80% on X-ray examination.

This polymer is free of branchings and has a high melting point (134° C.).

*Example 2.*

Operating as in Example 1 but using a catalyst prepared by mixing 6 g. magnesium (diphenylamide) bromide with 3 g. $TiCl_3$, 43 g. solid polyethylene, having an aspect similar to that of the preceding example are obtained.

*Example 3.*

5 g. aluminum bis(diphenylamide) chloride (obtained from $Al[N(C_6H_5)_2]_3$ and $AlCl_3$ in anhydrous ether and then removing all the ether by heating to 140° C. under reduced pressure of 1 mm. Hg), 1 g. $TiCl_3$, and 200 cc. anhydrous benzene are introduced into a 650 cc. oscillating autoclave under nitrogen.

Agitation is started, ethylene is added at room temperature up to a pressure of 30 atm. and the mixture is quickly heated to 120° C. After 10 hours, the pressure has gone down to about 15 atm. Heating is now stopped and 71 g. of a solid compact light-violet polymer are withdrawn from the autoclave, which are purified from the catalyst residues as described in Example 1.

*Example 4.*

3.5 g. magnesium (diethylamide) bromide, 1.5 g. $TiCl_3$ and 250 cc. anhydrous benzene are introduced under nitrogen into a 1 liter rotating autoclave containing 6 stainless balls of 1 inch diameter.

Ethylene is added up to a pressure of 40 atm. at room temperature and the autoclave is agitated and heated to 120° C. After 10 hours during which the pressure has decreased to about 15 atm., heating is stopped.

30 g. crystalline solid polyethylene are obtained by operating as described in the preceding examples.

*Example 5.*

Operating as described in Example 1, but using as a catalyst 6 g. aluminum tris(N-carbazyl) and 0.8 g. $TiCl_3$ in 250 cc. anhydrous benzene, 15 g. polythylene are obtained after 15 hours at 120° C.

*Example 6.*

6 g. aluminum bis-diphenylamide bromide, 1.5 g. $TiCl_3$ and 120 cc. anhydrous benzene are introduced under nitrogen into a 1100 cc. autoclave.

150 g. propylene (purity higher than 99%) are added and the temperature is quickly raised to 150° C. while agitating the autoclave. After 14 hours, heating is stopped and, when the autoclave is cold, the gaseous phase and then the liquid phase are discharged. From the latter, 19 g. powdery polypropylene can be isolated by addition of methanol acidified with concentrated hydrochloric acid.

This polymer shows a crystallinity of about 60% by X-ray examination.

*Example 7.*

By operating as described in Example 1, but using a catalyst prepared from 3.5 g. aluminum tris-diphenylamide and 1.5 g. vanadium trichloride, 110 g. linear polythylene having a molecular weight of 360,000 are obtained after about 8 hours.

*Example 8.*

1.5 g. aluminum bis(diethylamide) monochloride, 0.25 g. anhydrous $CoCl_2$ suspended in 200 cc. anhydrous benzene and then 65 g. butadiene (Phillips pure grade) are introduced into a 1100 cc. autoclave kept at 70° C.

Agitation is continued until the pressure from the initial value of 2.8 atm. decreases to 0.2 atm. Heating is then stopped and the reaction mass is discharged, which is a brown very viscous liquid. By addition of methanol, a white precipitate of polybutadiene is separated, which is purified from the catalyst residue by dissolving it in benzene under nitrogen and precipitating it again with methanol.

The polymer is finally dried at about 70° C. under a reduced pressure of 20 mm. Hg.

35 g. of a polymer, which by infra-red examination is found to contain 70% monomeric units with 1,2-syndiotactic enchainment, are obtained. This polymer is highly crystalline by X-ray examination.

*Example 9.*

Operating as in the preceding example, but at the temperature of 43° C., 10 g. polybutadiene which by infra-red examination are found to contain 80% of trans-1,4 monomeric units are obtained.

*Example 10.*

2.5 g. aluminum bis(diphenylamide) monochloride and 0.3 g. anhydrous $CoCl_2$ suspended in 200 cc. benzene are introduced into a 1 liter autoclave.

50 g. butadiene are then added and the autoclave is agitated and kept at the constant temperature of 80° C. After some hours heating is stopped and, proceeding as described in Example 8, 12 g. polymer consisting of 75% of 1,2-polybutadiene, which presents a crystallinity due to 1,2-syndiotactic structure, are isolated.

*Example 11.*

Proceeding as in the foregoing example, but using as a catalyst 2 g. aluminum tris(diethylamide) and 0.3 g. $Ti(OC_3H_7)_4$ dissolved in 200 cc. anhydrous benzene, 20 g. 1,2-syndiotactic polybutadiene which is crystalline by X-ray examination, are obtained.

*Example 12.*

Operating with butadiene as in the preceding examples and using a catalytic system consisting of 1 g. aluminum bis(diethylamide) monochloride and 0.3 g. $CrCl_3$ suspended in 150 cc. benzene, 15 g. of a polymer containing 75% of monomeric units with trans-1,4 enchainment are obtained.

*Example 13*

The procedure is that of Example 6, but a catalytic system consisting of 7.85 g. bis(magnesium iodide) phenylamide $[C_6H_5N(MgI)_2]$ and 2 g. $TiCl_3$ suspended in 200 cc. anhydrous benzene is used.

8 g. polypropylene having a high content (about 80%) of isotatctic macromolecules and showing by infra-red examination the presence of terminal vinyl groups together with a much lower amount of terminal vinylidenic groups are obtained.

The intrinsic viscosity, determined in tetrahydronaphthalene at 135° C., is 1.2.

*Example 14*

A suspension of 2.5 g. beryllium bis(diphenylamide), $Be[N(C_6H_5)_2]_2$, and of 0.8 g. $TiCl_3$ in 150 cc. anhydrous benzene is introduced, under nitrogen, into a 1100 cc. stainless steel autoclave. Ethylene is added, up to a pressure of 30 atmospheres and the autoclave is heated under stirring to 85° C. The reaction is continued for three hours. 45 g. of a polyethylene having characteristics similar to the one of Example 1 are obtained.

*Example 15*

Operating as in Example 14, and with the same catalyst, 125 g. propylene are polymerized at 140° C. The reaction is protracted for ten hours, after which a solid fibrous polymer is obtained in good yield.

*Example 16*

10 g. aluminum nitride, prepared by direct reaction between aluminum powder and nitrogen at high temperature, and 3 g. titanium trichloride suspended in 150 cc. heptane are introduced under nitrogen into a rotating autoclave containing 8 stainless steel balls.

Agitation is started and the autoclave is heated to 100° C. After 15 hours, 120 g. propylene are added and the autoclave is agitated for a further 10 hours. Heating is then stopped and all gaseous propylene, and the polymerization mass, containing the solid propylene polymer in the form of gray granules, are discharged.

After methanol addition the polymer is purified by removing the catalyst residues as described in Example 1.

37 g. solid polypropylene, partially crystalline by X-rays examination, are thus obtained.

It will be apparent from the foregoing that the new catalysts of this invention are generally useful for the polymerization of ethylene, the higher alpha-olefins, and diolefins containing a vinyl type double bond, and that many variations may be made in practicing the invention within the scope thereof as disclosed herein. Therefore, we intend to include within the province of the appended claims all such modifications as may be apparent to those skilled in the art from the description and examples given.

What is claimed is:

1. Polymerization catalysts consisting essentially of (1) a metal compound in which the metal is bound directly to nitrogen atoms, which does not contain metal-to-carbon bonds, and which is selected from the group consisting of (a) aluminum nitride; (b) a compound having the formula

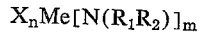

$$X_nMe[N(R_1R_2)]_m$$

wherein Me is a metal selected from the group consising of beryllium, magnesium and aluminum, $R_1$ and $R_2$ are selected from the group consisting of alkyl, cycloalkyl, aryl, alkylaryl radicals and radicals which when taken together form a heterocyclic radical with nitrogen, X is a halogen selected from the group consisting of chlorine, bromine and iodine, n is selected from the group consisting of zero and integers, m is an integer and the sum of $m+n$ is equal to the valence of the metal Me, and (c) a compound having the formula

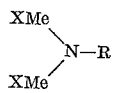

wherein X has the same meaning as in (b), Me is selected from the group consisting of beryllium and magnesium, and R is selected from the group consisting of alkyl, cycloalkyl, aryl and alkyl aryl radicals, with (2) halides of transition metals belonging to the 4th to 8th groups of the Mendeléeff Periodic Table in which the metal has a valence lower than its maximum valence.

2. Polymerization catalysts according to claim 1, characterized in consisting essentially of the combination of (1) a compound (b) with (2) a halide of a transition metal belonging to the 4th to 8th groups of the Mendeléeff Periodic Table in which the metal has a valence lower than its maximum valence.

3. Polymerization catalysts according to claim 1, characterized in consisting essentially of the combination of (1) a compound (c) with (2) a halide of a transition metal belonging to the 4th to 8th groups inclusive of the Mendeléeff Periodic Table in which the metal has a valence lower than its maximum valence.

4. A polymerization catalyst according to claim 2, characterized in that the compound (b) is a dialkyl-substituted amide of the selected metal.

5. A polymerization catalyst according to claim 2, characterized in that the compound (b) is a diaryl-substituted amide of the selected metal.

6. A polymerization catalyst according to claim 2, characterized in that the compound (b) is a monohalide of a dialkyl-substituted amide of the selected metal.

7. A polymerization catalyst according to claim 2, characterized in that the compound (b) is a monohalide of a diaryl-substituted amide of the selected metal.

8. A polymerization catalyst according to claim 2, characterized in that the compound (b) is a carbazyl of the selected metal.

9. A polymerization catalyst according to claim 3, characterized in that (c) is a bis(magnesium-halide) phenylamide.

10. A polymerization catalyst according to claim 1, characterized in consisting essentially of the combination of (1) aluminum nitride with (2) a halide of a transition metal belonging to the 4th to 8th groups inclusive of the Mendeléeff Periodic Table in which the metal has a valence lower than its maximum valence.

11. A polymerization catalyst consisting essentially of the combination of (1) aluminum nitride with (2) titanium trichloride.

12. A process for producing high polymers of olefins having a regular structure, which process comprises heating at least one olefin selected from the group consisting of ethylene, higher alpha-olefins of the formula $$CH_2=CHR$$

where R is a hydrocarbon radical, and conjugated diolefins having at least one vinyl bond, in contact with a catalyst according to claim 2.

13. A process for producing high polymers of olefins having a regular structure, which process comprises heating at least one olefin selected from the group consisting of ethylene, higher alpha-olefins of the formula $$CH_2=CHR$$

where R is a hydrocarbon radical, and conjugated diolefins having at least one vinyl bond, in contact with a catalyst according to claim 3.

14. A process for producing high polymers of olefins having a regular structure, which process comprises heating at least one olefin selected from the group consisting of ethylene, higher alpha-olefins of the formula $$CH_2=CHR$$

where R is a hydrocarbon radical, and conjugated diolefins having at least one vinyl bond, in contact with a catalyst according to claim 10.

15. A process for producing high polymers having a regular structure, which process comprises heating at least one olefin selected from the group consisting of ethylene, higher alpha-olefins of the formula $$CH_2=CHR$$

wherein R is a hydrocarbon radical, and conjugated diolefins having at least one vinyl bond, in contact with the catalyst of claim 11.

16. The process according to claim 12, characterized in that the olefin is heated in contact with the catalyst in a liquid medium which is at least a partial solvent for the compound of said formula $$X_nMe[N(R_1R_2)]_m$$

17. The process according to claim 13, characterized in that the olefin is heated in contact with the catalyst in a liquid medium which is at least a partial solvent for the compound of said formula $$\begin{array}{c} XMe \\ \phantom{XM}\diagdown \\ \phantom{XMeX}N-R \\ \phantom{XM}\diagup \\ XMe \end{array}$$

18. The process according to claim 14, characterized in that the olefin is heated in contact with the catalyst in a liquid medium which is at least a partial solvent for the aluminum nitride.

19. The process according to claim 15, characterized in that olefin is heated in contact with the catalyst in a liquid medium which is at least a partial solvent for the aluminum nitride.

References Cited by the Examiner

UNITED STATES PATENTS

| | | | |
|---|---|---|---|
| 2,905,661 | 9/59 | Muehlbauer et al. | 260—93.7 |
| 2,907,781 | 10/59 | Hermelin | 260—448 |
| 2,909,510 | 10/59 | Thomas | 260—93.7 |
| 2,910,493 | 10/59 | Rinse et al. | 260—448 |
| 2,918,494 | 12/59 | Closson et al. | 260—541 |
| 2,929,808 | 3/60 | Ross et al. | 260—94.9 |

JOSEPH L. SCHOFER, *Primary Examiner.*

MORRIS LIEBMAN, L. H. GASTON, *Examiners.*